Figure 1:
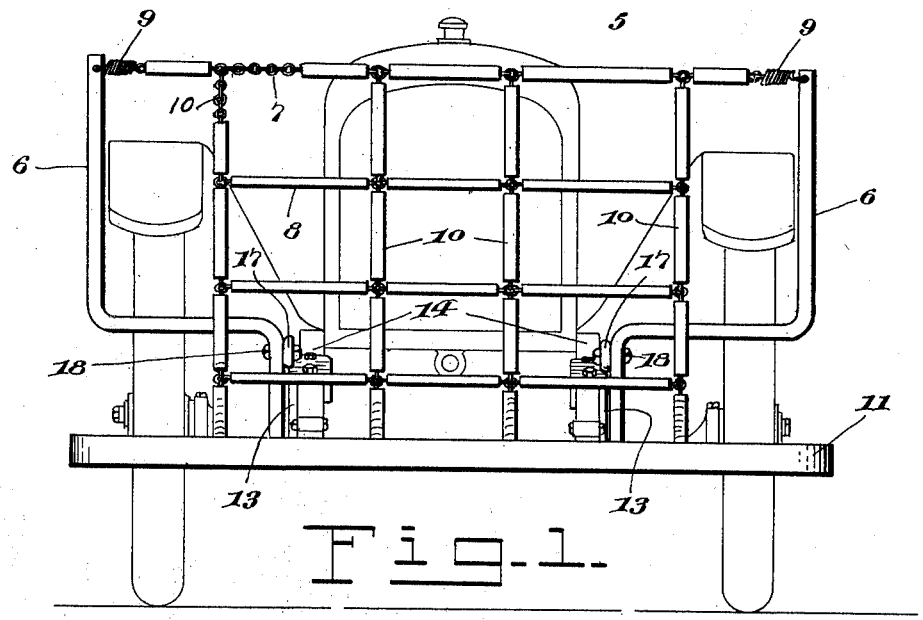

P. J. LA FLEUR.
FENDER.
APPLICATION FILED JAN. 15, 1921.

1,372,520.

Patented Mar. 22, 1921.

INVENTOR:
Peter J. La Fleur.
BY
ATTORNEYS.

UNITED STATES PATENT OFFICE.

PETER J. LA FLEUR, OF CHICAGO, ILLINOIS, ASSIGNOR OF ONE-HALF TO FERDINAND H. GUNTHER, OF CHICAGO, ILLINOIS.

FENDER.

1,372,520. Specification of Letters Patent. Patented Mar. 22, 1921.

Application filed January 15, 1921. Serial No. 437,537.

*To all whom it may concern:*

Be it known that I, PETER J. LA FLEUR, a citizen of the United States, residing at Chicago, in the county of Cook and State of Illinois, have invented new and useful Improvements in Fenders, of which the following is a specification.

The fender which is the subject matter of the present application for patent has been designed for attachment to motor vehicles, and it operates in conjunction with the usual bumper which is positioned transversely of the vehicle at the front thereof.

The invention has for its object to provide a fender which acts as a support for a person struck by a bumper, the fender being so positioned relative to the bumper that the victim is not pitched forwardly when struck by the latter.

With the object stated in view, the invention consists in a novel combination and arrangement of parts to be hereinafter described and claimed, and in order that the same may be better understood, reference is had to the accompanying drawing forming a part of this specification.

Figure 2:
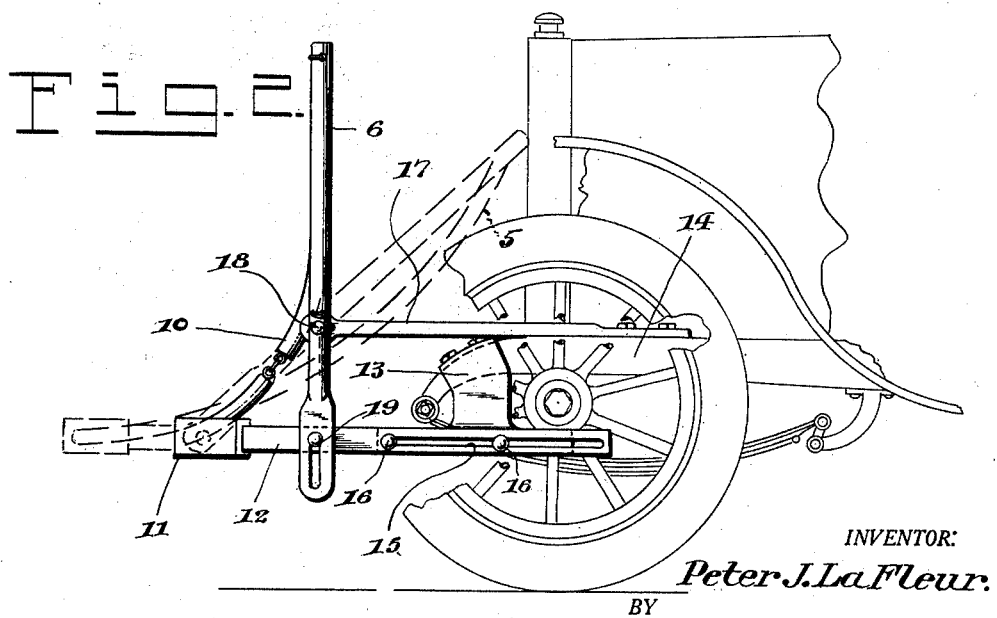

In the drawing,

Figure 1 is a front elevation showing the application of the invention, the fender being shown partly in section, and Fig. 2 is a side elevation.

Referring specifically to the drawing 5 denotes a fender in the form of a net stretched between frame side bars 6. The net-like structure is produced by chains or other flexible members 7 extending transversely between the side bars 6, and incased in rubber or other sheaths 8 to obtain a smooth surface. These chains are not connected directly to the side bars 6, but they are connected to one end of coiled springs 9, which latter are connected at their other ends to the side bars. The chains are therefore resiliently connected to the side bars 6. The net also includes covered chains 10 extending vertically and crosswise of the chains 7, and connected thereto at their intersections.

At 11 is shown a bumper bar which is positioned transversely of the car in advance of the front wheels thereof, and has rearwardly extending attaching arms 12 fastened to a bracket 13 carried by the forward ends of the side frame members 14 of the car. The rear ends of the arms 12 have longitudinal slots 15 taking bolts 16 carried by bracket 13, whereby the bumper is so supported that it is free to be shifted rearwardly to a limited extent depending on the length of the slots.

The frame members 14 also carry forwardly extending supporting arms 17 for the fender 5, the frame side bars 6 of the latter being pivoted near their lower ends to the outer ends of the arms 17, as shown at 18. The lower ends of the side bars 6 are loosely connected to the bumper arms 12, a pin-and-slot connection 19 being provided.

The fender 5 is attached at the bottom to the bumper 11, from which latter it extends upwardly to the height of the side bars 6, the latter being located a short distance to the rear of the bumper. The fender is normally in erect position, except at the bottom where the net curves over to the bumper.

When a person is struck by the bumper 11, he is not pitched forwardly, but is thrown rearwardly, this being due to the low position of the bumper, the same being only about one foot from the ground. Upon being thrown against the fender 5, the weight of the person causes the same to tilt rearwardly, the side bars 6 swinging about their pivots 18, and as the side bars are connected at their lower ends to the bumper arms 12, and the latter are slidably supported, said arms are carried forwardly to advance the bumper, so that the same and the fender now assume the dotted line position in Fig. 2, and a rest for the victims is had which has a sufficient rearward incline to support the body.

I claim:

1. A motor vehicle fender comprising a net-like member, upright side frame bars supporting said member, a bumper to which the net-like member is attached at its lower end, a support for the bumper to permit the same to shift rearwardly, a support to which the fender frame bars are pivoted, and connections between said frame bars and the bumper.

2. A motor vehicle fender comprising a net-like member, pivotally supported upright side frame bars carrying said member, a bumper to which the net-like member is attached at its lower end, supporting arms for the bumper extending rearwardly therefrom, means for slidably supporting said arms, and connections between the side frame bars and the bumper supporting arms.

In testimony whereof I affix my signature.

PETER J. LA FLEUR.